United States Patent
Anderson (10) Patent No.: US 6,845,736 B1
(45) Date of Patent: Jan. 25, 2005

(54) RETRACTABLE TETHER FOR ANIMALS

(76) Inventor: Paul G. Anderson, 10106 Beach Mill Rd., Great Falls, VA (US) 22066

(*) Notice: Subject to any disclaimer, the term of this patent is extended or adjusted under 35 U.S.C. 154(b) by 0 days.

(21) Appl. No.: 10/209,864

(22) Filed: Aug. 2, 2002

(51) Int. Cl.⁷ .......................... A01K 27/00; B65H 75/34
(52) U.S. Cl. ....................................... 119/796; 119/797
(58) Field of Search .................................. 119/712, 729, 119/730, 792–799, 769, 780, 781; 242/46.8, 156, 166, 371–375, 107.6, 381.6, 384.7, 385.4, 396.1, 396.2, 396.3, 396.4; 267/156, 166, 154, 155, 157, 167, 199, 89

(56) References Cited

U.S. PATENT DOCUMENTS

| | | | |
|---|---|---|---|
| 301,963 A | * 7/1884 | Clayton | 267/156 |
| 456,833 A | * 7/1891 | Morse | 187/45 |
| 1,777,784 A | 10/1930 | Cole | |
| 2,222,409 A | 11/1940 | Gottlieb | |
| 2,250,171 A | * 7/1941 | Wilkins | 242/377 |
| 2,673,694 A | 3/1954 | Howell | |
| 2,833,250 A | 5/1958 | Beebe | |
| 3,123,052 A | * 3/1964 | Marshall | 119/789 |
| 3,156,430 A | 11/1964 | Zivi | |
| 3,233,591 A | 2/1966 | Rogers | |
| 3,318,288 A | * 5/1967 | Mullritter | 119/796 |
| 3,337,155 A | 8/1967 | Binding | |
| 3,381,915 A | 5/1968 | Nelson | |
| 3,477,410 A | * 11/1969 | Lettieri | 119/794 |
| 3,532,197 A | * 10/1970 | King | 192/41 S |
| 3,853,283 A | 12/1974 | Croce | |
| 4,018,189 A | 4/1977 | Umphries et al. | |
| 4,084,764 A | 4/1978 | Mogerlein | |
| 4,165,713 A | 8/1979 | Brawner et al. | |
| 4,202,510 A | 5/1980 | Stanish | |
| 4,253,620 A | 3/1981 | Takei | |
| 4,328,766 A | 5/1982 | Deibert | |
| 4,382,563 A | 5/1983 | Morita | |
| 4,429,840 A | 2/1984 | Chawla | |
| 4,462,551 A | * 7/1984 | Bloch | 242/442 |
| 4,488,511 A | 12/1984 | Grassano | |
| 4,501,230 A | 2/1985 | Talo | |
| 4,595,184 A | * 6/1986 | Bohm et al. | 267/156 |
| 4,756,087 A | 7/1988 | Sing | |
| 4,757,955 A | 7/1988 | Simmons | |
| 4,887,551 A | * 12/1989 | Musetti | 119/796 |
| 4,964,370 A | 10/1990 | Peterson | |
| 4,977,860 A | * 12/1990 | Harwell | 119/794 |
| 4,989,804 A | 2/1991 | Ebner | |
| 4,993,657 A | * 2/1991 | Brown | 242/372 |
| 5,014,437 A | 5/1991 | Sun | |
| 5,076,510 A | * 12/1991 | Norlander | 242/422.4 |
| 5,226,867 A | * 7/1993 | Beal | 482/127 |

(List continued on next page.)

FOREIGN PATENT DOCUMENTS

| | | | |
|---|---|---|---|
| EP | 298521 | * | 1/1989 |
| EP | 464725 | * | 6/1991 |
| GB | 2219646 | * | 12/1989 |
| GB | 2292875 | * | 3/1996 |

OTHER PUBLICATIONS

Rao, S.S. Mechanical Vibrations 2nd edition (New York, Addison–Wesley), pp. 14–15.*

Primary Examiner—Peter M. Poon
Assistant Examiner—D Parsley
(74) Attorney, Agent, or Firm—Kramer & Amado, P.C.

(57) ABSTRACT

A retractable animal tether, comprising a hand-held support; a spool rotatably mounted on the support; and a flexible cord wound on the spool, said flexible cord having an end which is connected to the spool and a second end which may be connected with the animal. The application of a first force F1 to a free end of the flexible cord causes a portion of the flexible cord to unwind from the spool. The tether also includes a means for preventing the remainder of the flexible cord from unwinding from the spool unless a second force F2 is applied to the free end of the flexible cord, said force F2 being greater than said force F1.

31 Claims, 7 Drawing Sheets

U.S. PATENT DOCUMENTS

| | | | |
|---|---|---|---|
| 5,255,768 A | | 10/1993 | Kasper |
| 5,377,626 A | * | 1/1995 | Kilsby et al. ............... 119/796 |
| 5,482,100 A | * | 1/1996 | Kuhar ........................ 160/170 |
| 5,669,571 A | | 9/1997 | Graybill |
| 5,697,572 A | * | 12/1997 | Salentine et al. ........... 242/379 |
| 5,697,599 A | * | 12/1997 | Lamb .......................... 254/328 |
| 5,733,231 A | * | 3/1998 | Corn et al. .................. 482/120 |
| 6,019,304 A | | 2/2000 | Skowronski |
| 6,148,773 A | * | 11/2000 | Bogdahn .................... 119/796 |
| 6,405,683 B1 | * | 6/2002 | Walter et al. ............... 119/772 |

* cited by examiner

RETRACTABLE TETHER FOR ANIMALS

FIELD OF THE INVENTION

This invention is directed to an improved retractable tether for pets. Specifically, the invention provides a retractable animal tether having a flexible tether wound on a spool; and a mechanism providing variable resistance to rotation of the spool as an animal unwinds the tether from the spool. The tether may be a hand-held tether, such as a leash, or it may be mounted to a wall or to a horizontal surface, such as the ground or a floor.

BACKGROUND OF THE INVENTION

Retractable leashes for dogs and other animals are very well known. They typically feature a housing containing a spool rotatably mounted on the axle. A flexible cord has a first end having a clip, which may be attached to a collar on an animal. A second end of the cord passes through an opening in the housing and connects rigidly to the spool. A spring causes the spool to preferentially rotate in a first direction so as to wind the cord onto the spool. When the spool rotates in a second direction so as to unwind the cord, tension is placed on the spring. In the case of a leash, the housing is hand-held; in the case of an anchored tether, the housing may be mounted to a wall, a floor, or the ground.

Once the first end of the cord is connected to the animal's collar, the animal's distance from the spool determines the amount of tension on the spring. As the animal pulls away from the spool, he pulls on the cord, causing the spool to rotate in the second direction so as to pay out the cord. This applies tension to the spring. When the animal moves toward the spool, the tension on the spring is released, causing the spool to rotate in the first direction so as to wind the cord onto the spool.

The spring used in these retractable leashes is very light and substantially constant, so that the animal is able to move freely. No significant resistance is offered by the spring as the cord pays out. This is advantageous because, it would be tiring for both the animal and the owner to have to pull against the resistance exerted by a strong spring. What is less advantageous about this spring is that it is easy for the animal to run off, hitting the end of the cord with great force and potentially pulling the housing of a hand-held leash out of the owner's hand. Also, since most leashes are mounted to a collar around the animal's throat, when the animal reaches the end of the cord, the cord can potentially cause discomfort or possible injury to the animal by pulling the collar sharply against the animal's throat. Similarly, a large dog could potentially uproot a tether mounted in the ground.

Other desirable features possessed by most retractable animal tethers include a mechanism to lock the lead at a fixed length, allowing the owner to maintain tight control over the animal. Also, these retractable tethers include a brake that can be used to immediately stop an animal. This is important because, if the animal approaches another animal or a person in a threatening way, the owner must be able to immediately stop forward momentum of the animal.

It is also known to provide leashes having shock absorbers positioned on the cord, near the animal. As the animal reaches the end of the leash, this is intended to attenuate the force of the impact of the animal's collar, which is attached to the leash, against the animal's throat, resulting in reduced discomfort to the animal. However, these shock absorbers are bulky and add additional weight to the end of the leash connected to the animal's collar. Also, the shock absorbers of the prior art do not allow an owner to instantly stop forward movement of the animal, should it be necessary to do so. This is because the shock absorbers typically attenuate shock through the use of springs or similar structures at the pet's end of the leash, beyond the reach of the owner. These springs allow the cord to reversibly extend when the animal pulls on the leash.

It is an object of this invention to provide a retractable leash having a variable resistance.

It is a further object of the invention to provide a retractable leash having a reduced likelihood to cause discomfort or injury to an animal.

It is a third object of the invention to provide a retractable leash which provides both a pet and his owner with feedback, letting them know when the pet is approaching the end of the leash. This allows both to react.

It is a fourth object of the invention to provide a retractable pet leash which provides both a mechanism for providing increased resistance to forward momentum by a pet as it approaches the end of the leash, and a braking mechanism for halting forward momentum by the pet at any time.

It is a fifth object of the invention to provide a retractable pet which is more comfortable for the pet owner to use.

SUMMARY OF THE INVENTION

The present invention discloses a retractable animal tether, comprising a support, a spool rotatably mounted on the support, a flexible cord wound on the spool, and a spring system providing variable resistance to rotation of the spool as the cord is unwound from the spool.

The present invention also relates to a retractable animal tether mounted on a spool, where the tether comprises a flexible cord having a first portion and a second portion, wherein the second portion of the cord is adapted to be connected to a leash or harness worn by an animal. The apparatus additionally includes a spool rotatably mounted on a support. The flexible cord is wound on the spool, with the first portion of the flexible cord being connected to the spool, wherein the application of a first force F1 to the second portion of the flexible cord by the animal causes the second portion of the flexible cord to unwind from the spool. The invention additionally includes a mechanism which provides a variable resistance to rotation of the spool. This variable resistance mechanism prevents the first portion of the flexible cord from unwinding from the spool unless a second force F2 is applied to the second portion of the flexible cord by the animal, said force F2 being greater than said force F1.

The present invention further relates to a device for retractably holding a cord, comprising a housing; an axle rigidly mounted in the housing; and a spool having an inner surface and an outer surface. The spool is rotatably mounted on the axle, with the inner surface of the spool being spaced from the axle. A flexible cord is wound on the outer surface of the spool. The cord has a first end, which is rigidly connected to the spool, and a second end, which extends through a passage in the housing. A spirally coiled spring is positioned between the inner surface of the spool and the axle. A first end of the spring is rigidly connected to the axle, and a second end of the spring is rigidly connected to the inner surface of the spool. The first end of the spring has a spring constant which is less than the spring constant of the second end of the spring.

DETAILED DESCRIPTION OF THE INVENTION

Figure 1:
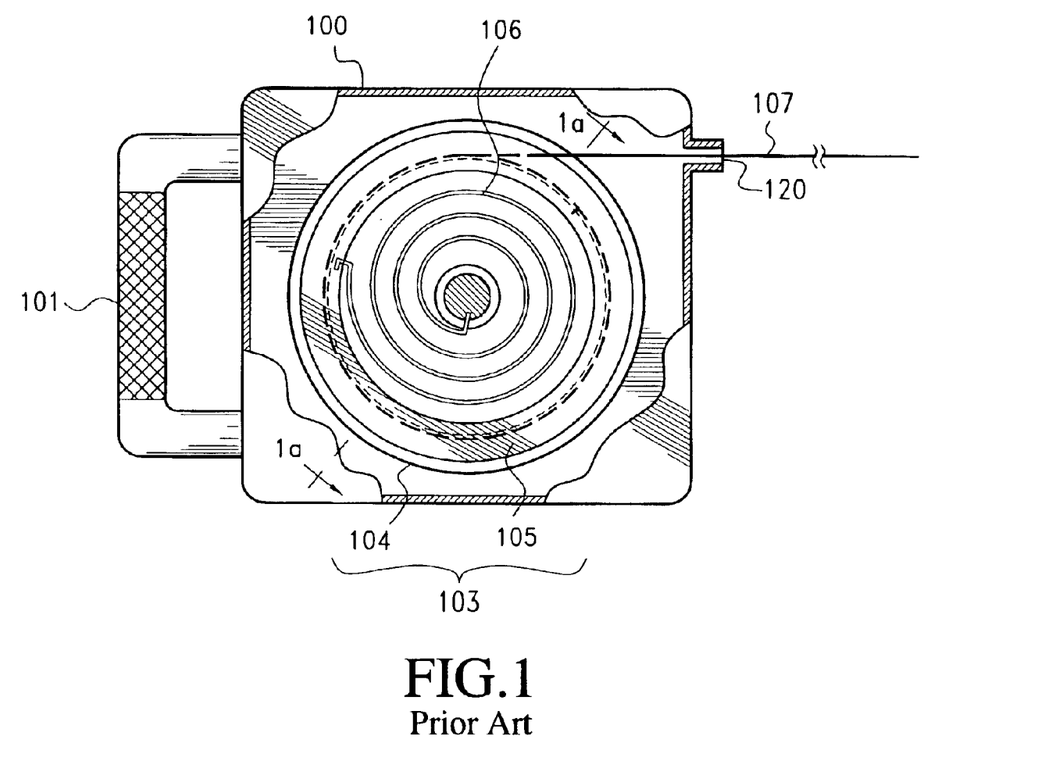
FIGS. 1 and 1a show two views of a retractable pet leash according to the prior art.
Figure 1A:
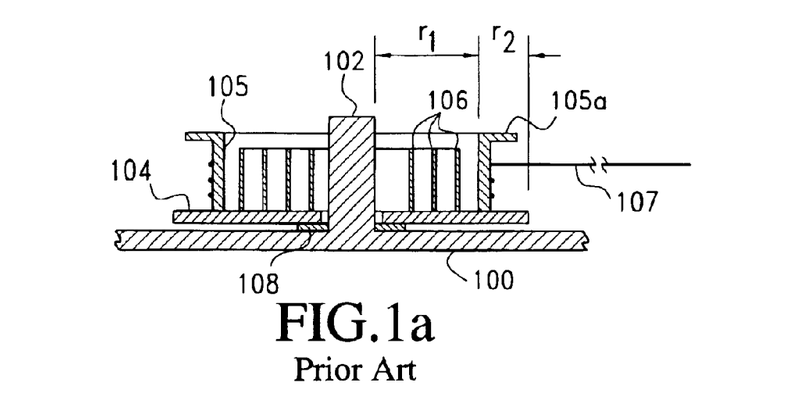

A retractable pet leash according to the prior art is shown in FIGS. 1 and 1a. The pet leash assembly comprises a housing 100 with a handle 101. Housing 100 has a top, a bottom, and a peripheral wall, with an opening 120 through the peripheral wall. Within the housing is an axle 102, which is rigidly mounted to the bottom of the housing. A spool 103 is rotatably mounted on the axle 102. For ease of rotation, the spool may be isolated from the bottom surface of the housing by a washer 108 made of a low-friction material. Suitable low-friction materials include a metal washer with a coating of grease or oil, or a washer formed of a low surface energy polymer, such as polytetrafluoroethylene. The spool 103 includes a disc 104 having a hole therethrough. Axle 102 passes through the hole in the disc 104, allowing the disc to rotate freely around the axle. A cylindrical wall 105 having an inner surface and an outer surface projects from disc 104 toward the top surface of the housing (FIG. 1a; top surface of the housing not shown). Wall 105 has a flange 105a on its upper edge which projects outwardly, away from axle 102 (FIG. 1a). The cylindrical wall 105 is positioned so that the inner surface of the wall 105 is separated from axle 102 by a distance r1, and the outer surface of the wall 105 is separated from the outer edge of disc 104 by a distance r2.

According to the prior art, a spirally coiled spring 106 is positioned between axle 102 and the inner surface of wall 105. Spring 106 has a plurality of coils, and is positioned by rigidly attaching the end of the innermost coil to axle 102, and rigidly attaching the end of the outermost coil to the inner surface of wall 105 (FIG. 1). Spring 106 is arranged so that it is loosely coiled around axle 102. A leash or cord 107 has a free first end that is adapted to be fixed to a collar or harness worn by an animal. The second end of cord 107 is fixed to the outer surface of wall 105 (FIG. 1). The cord is normally wrapped around the outer surface of wall 105, with the flange 105a on wall 105 and the peripheral edge of disc 104 serving to prevent the wrapped cord from slipping off the edge of the wall. The free end of cord 107 passes through opening 120 in the peripheral wall of housing 100.

In use, the free end of cord 107 is attached to a collar or harness worn by an animal. When the animal walks or runs away from the housing 100, which is normally held by the animal's owner with handle 101, spool 103 rotates in a clockwise direction, unwinding the leash as it does so. As spool 103 rotates, the inner coils of spring 106 become tightly wrapped around axle 102, placing tension on the spirally coiled spring. When the animal moves toward the housing, or when the free end of the cord is detached from the animal, the tightly wrapped coils of spring 106 unwrap, relieving the tension on the spring and causing the spool to rotate in an counterclockwise direction. As the spool rotates, the cord winds up again around the wall 105.

To unwind the cord, the animal is required to pull against the spring 106 with a force greater than F, where $F=-K(\Delta x)$, where $\Delta x$ is the distance traveled by the animal. Normally, the spring 106 is a very light spring having a very low spring constant K which exerts little or no resistance to the animal's movement. A strong spring is undesirable because the strong spring would have a large spring constant, and act to prevent the spool from rotating so as to pay out the leash. The animal would therefore have to exert considerable force to cause the leash to unwind, which is restrictive and exhausting for the animal. Also, the pet owner would find it tiring to pull against the leash if a strong spring was used, as the strong spring would tend to force the leash to rewind.

However, there is one disadvantage to the use of a weak spring. If the animal chooses to run away from the pet owner, the weak spring 106 allows the animal to run with substantially no resistance until the end of the leash is reached. At this point, one of two things happens. The animal may be stopped very suddenly by the leash with great force. If the leash is attached to the animal's collar, this can cause discomfort or injury to the animal's throat. Alternatively, if an animal chooses to run while the owner is looking the other way, the owner has no warning that the animal is running. When the animal reaches the end of the cord, it may manage to pull the lead out of the owner's hand. This leaves the animal in a running free, and potentially causing injury to itself or to others.

The current invention incorporates both the advantages inherent in using a weak spring in a retractable dog leash, and in the advantages in using a strong spring in a retractable dog leash, while avoiding the disadvantages of both. This is done through the use of a spring system that applies variable resistance to rotation of a spool carrying a flexible cord in a retractable pet leash. Initaially, the spring system applies a low resistance to rotation of the spool, allowing the spool to pay out the cord relatively freely in response to a comparatively small force exerted by the animal. Shortly before the animal reaches the end of the cord, the spring system applies a comparatively large resistance to rotation of the spool, so that the animal is forced to exert a comparatively large force to cause the spool to pay out additional cord. The spring system preferably takes the form of a first spring having a spring constant K1, wherein tension is applied to said first spring by rotation of the spool while said first portion of the flexible cord is unwinding, but not while the second portion of the flexible cord is unwinding. The device may also comprise a second spring having a spring constant K2, wherein tension is applied to said second spring by rotation of the spool while said second portion of the flexible cord is unwinding. Spring constant K2 is less than K1, so that it is easier for the animal to exert the requisite force to unwind the second portion of the flexible cord. In one embodiment, the first and second springs are part of a single unitary structure. In a second embodiment, the spring system comprises a plurality of springs.

Figure 2:
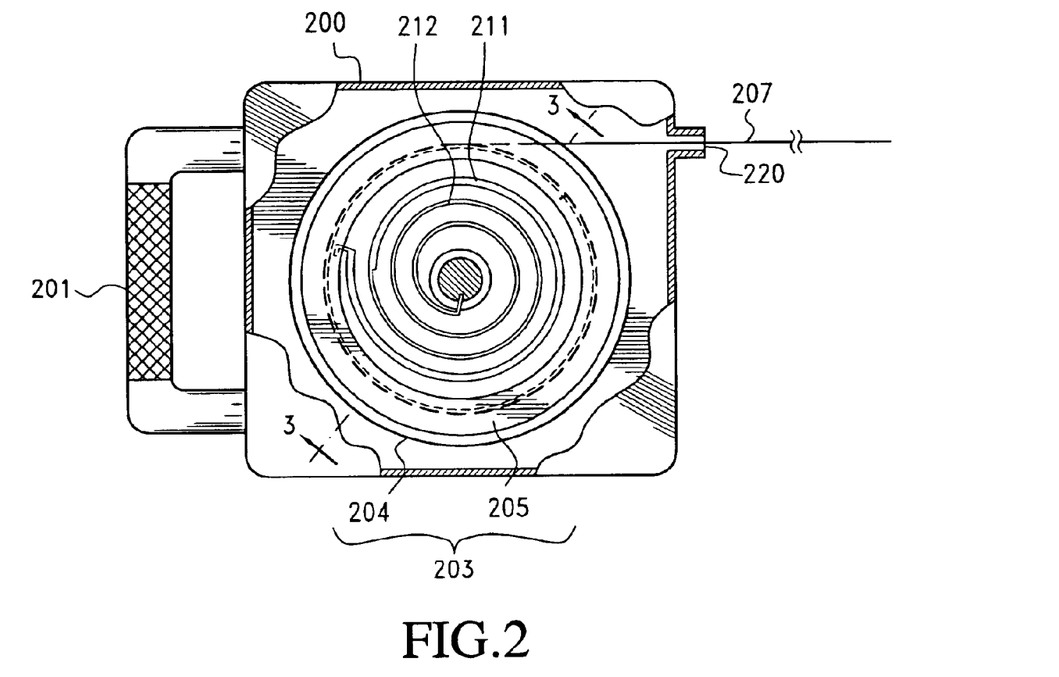
FIG. 2 shows a top view of a retractable pet leash according to the current invention.
Figure 3:
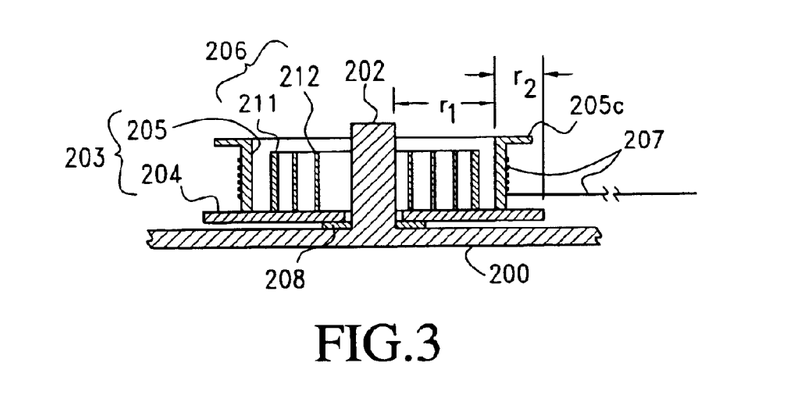
FIG. 3 shows a side view of a retractable pet leash according to the current invention.

Such a pet leash is shown in FIGS. 2 and 3. The pet leash assembly comprises a housing 200 with a handle 201. Within the housing is a non-rotatable axle 202. A spool 203 is rotatably mounted on the axle 202. For ease of rotation, the spool may be isolated from the bottom surface of the housing by a washer 208 made of a low-friction material. The spool 203 includes a disc 204 having a hole therethrough. Axle 202 passes through the hole in the disc 204, allowing the disc to rotate freely around the axle. A cylindrical wall 205 having an inner surface and an outer surface projects from disc 204 toward the top surface of the housing (FIG. 3; top surface of the housing not shown). Wall 205 has a flange 205c on its upper edge which projects outwardly, away from axle 202 (FIG. 3; flange not shown in FIG. 2). The cylindrical wall 205 is positioned so that the inner surface of the wall 205 is separated from axle 202 by a distance r1, and the outer surface of the wall 205 is separated from the outer edge of disc 204 by a distance r2.

A spirally coiled spring 206 is positioned between axle 202 and the inner surface of wall 205. Spring 206 has a plurality of coils, and is positioned by rigidly attaching the end of the innermost coil to axle 202, and rigidly attaching the end of the outermost coil to the inner surface of wall 205 (FIG. 2). Spring 206 is arranged so that it is loosely coiled around axle 202. A leash or cord 207 has a free first end, which is adapted to be fixed to a collar, or harness worn by an animal. The second end of cord 207 is fixed to the outer surface of wall 205 (FIG. 2). The cord is normally wrapped around the outer surface of wall 205, with the flange 205c on wall 205 and the peripheral edge of disc 204 serving to prevent the wrapped cord from slipping off the edge of the wall. The free end of cord 207 passes through opening 220 in the peripheral wall of housing 200.

In the inventive pet leash, the spring 206 is a coiled spiral spring having a first portion 211 having a spring constant K1, and a second portion 212 having a spring constant of K2, where K2 is less than K1. The first portion 211 of the coiled spring comprises at least one outer coil, and the second portion 212 of the coiled spring comprises a plurality of inner coils of the spring. Preferably, the coiled spring includes a plurality of outer coils having a spring constant K1, and a plurality of inner coils having a spring constant of K2, where K2 is less than K1. For example, a spring may comprise a total of 40 coils, with 10 outer coils having a spring constant K1, and 30 inner coils having a spring constant of K2. The coiled spring is positioned between axle 202 and the inner surface of wall 205, with the innermost coil of 212 being rigidly fixed to axle 202. Similarly, the outermost coil of 211 is rigidly fixed to the inner surface of wall 205 (FIG. 2). Again, cord 207 is wound around the outer surface of wall 5. The cord has a free end, which passes through the opening 220 in housing 200, and a second end, which is rigidly fixed to the outer surface of wall 205.

Figure 4A:
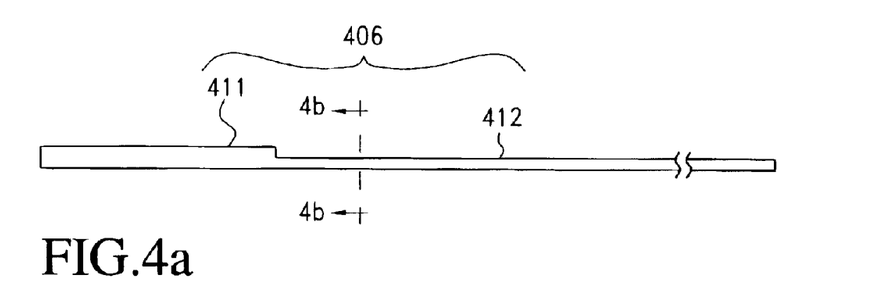
FIGS. 4a and 4b show a first embodiment of a spring having variable resistance.
Figure 4B:
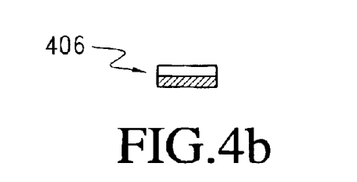
Figure 5A:
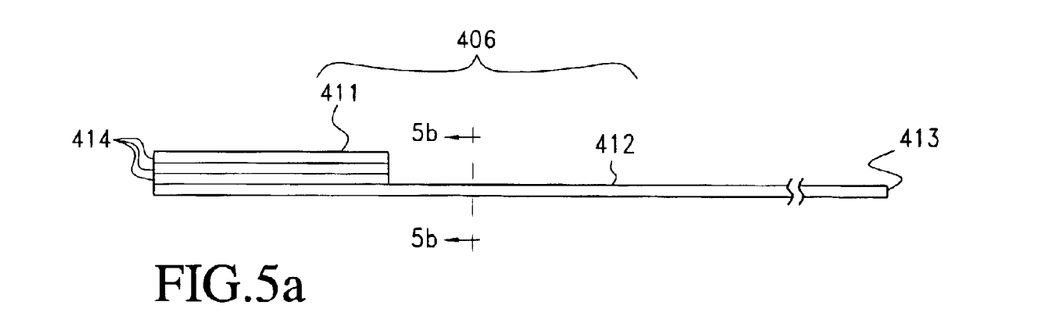
FIGS. 5a, 5b, and 5c show a second embodiment of a spring having variable resistance.
Figure 5B:
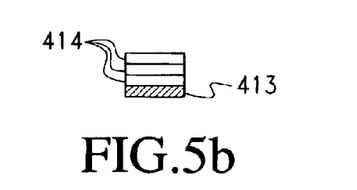

A spirally coiled spring having a variable spring constant can be prepared in a number of ways. Possible methods involve coiling a sheet of planar material which has a variable resistance to bending. For example, a spring may be prepared by coiling a strip of sheet metal stock having a uniform width and composition, but a variable thickness. Such a sheet material 406 for use in preparation of spring 206 is shown in FIGS. 4a and 4b. The strip of metal 406 includes a thin, flexible portion 412 and a thicker, less flexible portion 411. The strip 406 is coiled from the thinner end toward the thicker end, producing a plurality of inner coils having a low spring constant K2 and one or more outer coils having a higher spring constant K1. An alternative method for producing such a spring involves use of a material constructed from a plurality of layers (FIGS. 5a and 5b). A thin, flexible sheet of metal is used as a base layer 413 having a first length d1. One or more layers 414 of thin flexible metal having a second length d2, where d2 is less than d1, are then stacked on top of base layer 413, with one end of each layer 414 being flush with one end of layer 413. The layers may be consolidated into a single unitary structure by laminating each layer 414 to the preceding layer with an adhesive, if desired. Alternatively, the layers may be stacked without being bonded or fastened together, allowing them to flex independently.

Figure 5C:
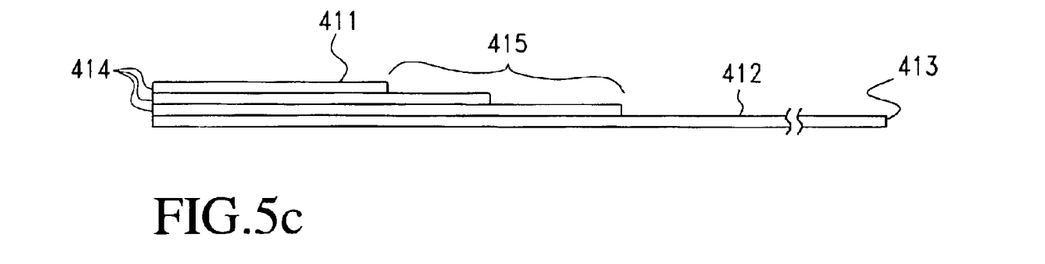

The layered structure is then coiled from the non-layered end toward the layered or laminated end, producing a plurality of inner coils made from a single layer of material, where the inner coils have a low spring constant K2, and one or more outer coils are made from a plurality of layers which act as multiple springs in parallel. The plurality of layers collectively have a higher spring constant K1, where $K1=K2+nK_{414}$, where $K_{414}$ is the spring constant of each layer 414 after coiling, and n is the number of layers 414. FIG. 5c shows a further embodiment of such a layered spring, in which the layers 414 have progressively decreasing length, with the longest layer 414 being layered directly on layer 413. A first terminal portion 412 of the laminate therefore has a single layer 413; a second terminal portion 411 of the laminate has a plurality of layers 414 stacked on the layer 413; and an intermediate section 415 of the laminate has a gradually increasing number of layers. The resulting structure is then coiled from the non-layered end toward the layered or laminated end. The resulting spirally coiled spring has a plurality of inner coils made from a single layer of material, where the inner coils have a low spring constant K2, and a plurality of outer coils made from a plurality of layers, with the number of layers gradually increasing from the inner coils toward the outer coils. The spring constant of the spirally coiled spring gradually increases in a stepwise fashion from K2 to K1, where $K1=K2+nK_{414}$.

Figure 6A:
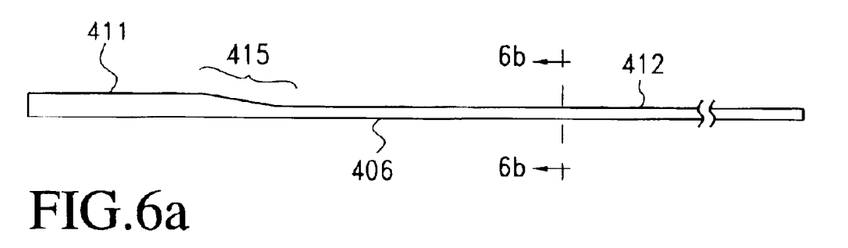
FIGS. 6a and 6b show a third embodiment of a spring having variable resistance.
Figure 6B:
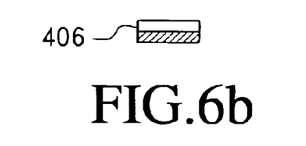
Figure 7A:
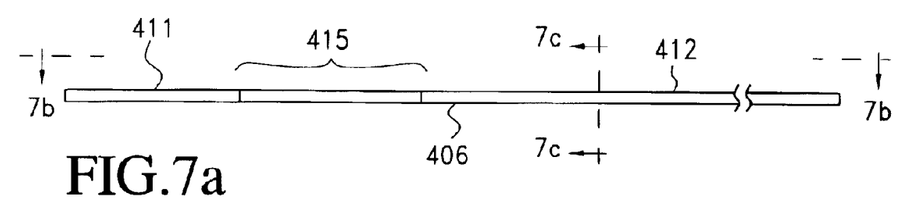
FIGS. 7a, 7b, and 7c show a fourth embodiment of a spring having variable resistance.
Figure 7B:
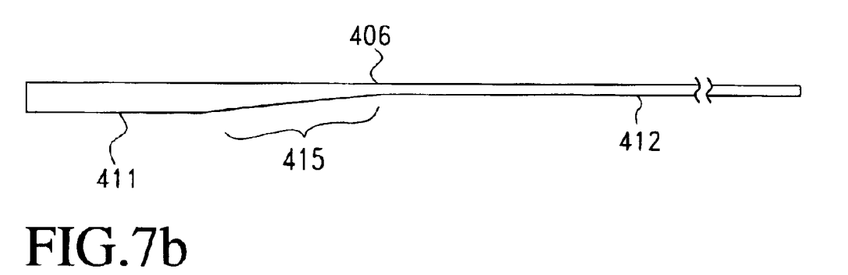
Figure 7C:
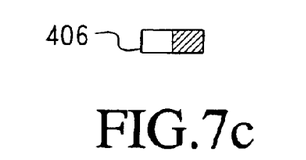

FIG. 6a shows a non-laminated strip of sheet metal for preparation of a spirally coiled spring having variable thickness (FIG. 6b). As seen in FIG. 6a, the strip of metal 406 includes a thin, flexible portion 412 and a thicker, less flexible portion 411. In between these portions is an intermediate section 415 of gradually increasing thickness. The strip 406 is then coiled from the thinner end toward the thicker end, producing a plurality of inner coils having a low spring constant K2 and one or more outer coils having a higher spring constant K1. Additionally, the coiled spring has one or more intermediate coils having a variable spring constant which gradually increases from K1 to K2. Alternatively, a non-laminated strip of sheet metal having variable width and constant thickness may be used for preparation of a spirally coiled spring. As seen in FIGS. 7b and 7c, the strip of metal 406 includes a narrow, flexible portion 412 and a wider, less flexible portion 411. As seen in FIG. 7a, the thickness of the metal sheet is constant throughout. In between these portions, there may be an intermediate section 415 of gradually increasing width. The strip 406 is then coiled from the narrow end toward the wide end, producing a plurality of inner coils having a low spring constant K2 and one or more outer coils having a higher spring constant K1. Additionally, if intermediate portion 415 is present, the coiled spring will have one or more intermediate coils having a variable spring constant which gradually increases from K1 to K2.

Figure 8A:
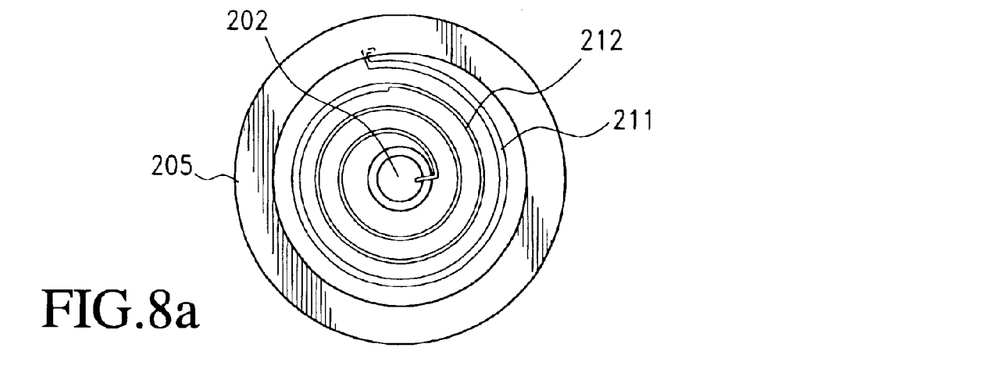
FIGS. 8a, 8b, and 8c show the invention in operation.
Figure 8B:
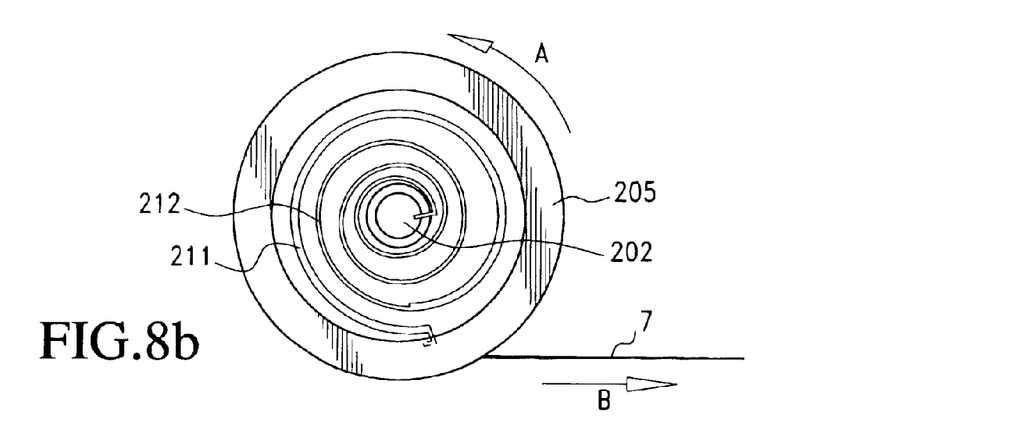
Figure 8C:
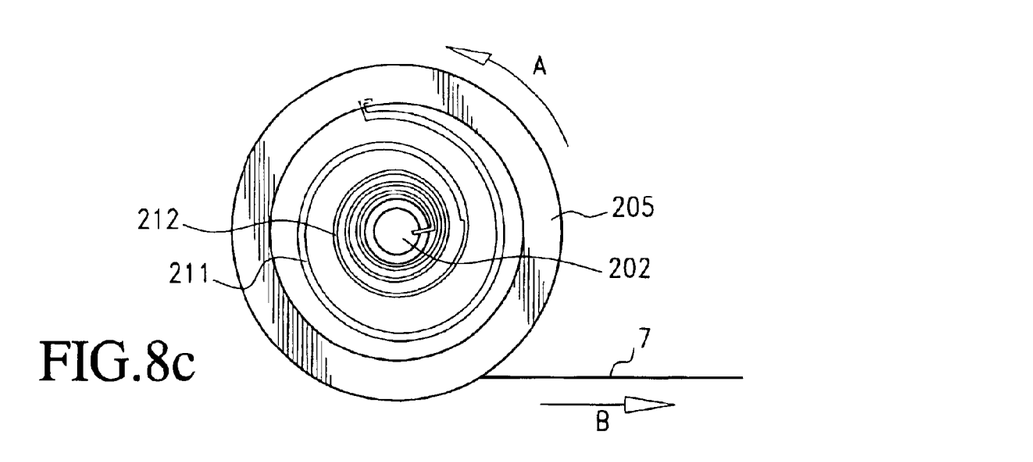

The operation of the spring is shown in FIGS. 8a through 8c. At rest, with substantially no force applied to the spring, the spiral spring is loosely coiled and positioned between axle 202 and wall 205. One end of the portion 212 of the spring is secured to the axle, while the end of portion 211 of the spring is secured to the wall 205 (FIG. 8a). As the spool rotates in the direction of arrow A, the inner coils of the portion 212 of the spring, having a low spring constant K2, are wrapped tightly around axle 202 (FIG. 8b). This applies tension to the inner coils of the spring. Due to the low spring constant, a relatively small force is required to rotate the spool so as to apply tension to the spring's inner coils. During this process, substantially no tension is applied to the outer coil or coils 211 of the spring, which have a high effective spring constant K1. At a later time, after substantially the entire inner portion 212 of the spring has been wrapped around axle 202 (FIG. 8c), the outer coil or coils 211 of the spring extend from wall 205 to axle 202. As the spool continues to rotate in the direction of arrow A, the outer coils 211 begin to wrap around the axle, applying tension to the outer coils of the spring. Due to the high spring constant of the outer coils in portion 211 of the spring, a substantially greater force is required to rotate the spool to apply tension to the spring's outer coils than is required to rotate the spool to apply tension to the spring's inner coils. Please note that, as previously described, the coil spring may be a single unitary structure in which the outer coils have a higher spring constant than the inner coils, or the coil spring may be manufactured from a plurality of layered springs which flex independently. If a plurality of layered springs are used, the layered springs include a long outer spring 413 and at least one short inner spring 414, with the outermost end of each of springs 413 and 414 being fixed to the wall 205 and the innermost end of 413 being fixed to the axle. As the spool rotates, the inner coils of spring 413 wind around the axle. As the spool continues to rotate, the outer coils of spring 413 begin to wind around the axle. Since the independent spring 414 is positioned on the inner surface of spring 413, as the outer coils of spring 413 wind around the axle, the spring 414 is forced to wrap around the axle as well, placing both springs under tension simultaneously. Thus, the two springs act in parallel as if they were a single spring having an effective spring constant $K_{eff}=K1+K2$. The inner end of spring(s) 414 is free; however, it is constrained from moving out of the plane of spring 413 by a plate fixed to the upper surface of wall 205 (not shown in the figures), or by an upper surface of the housing structure 200. This prevents spring or springs 414 from uncoiling.

When the cord 207 wrapped around wall 205 is pulled in the direction of arrow B (FIGS. 8b and 8c) by an animal, the animal exerts force which causes the spool to rotate and unwind the cord 207. Initially, the animal is required to exert little force to rotate the spool, due to the low spring constant of inner coils 212. However, after the inner coils 212 of the spring have all been wrapped around axle 202, the animal is required to exert significantly greater force to rotate the spool so as to unwind a further length of cord, due to the higher spring constant of the outer coils 211 of the spring. This causes the cord to pull more tightly against both the animal and the pet owner's hand. Over time, the animal will learn that when it begins to have to pull harder to move further away from the housing holding the spool, it is reaching the end of the leash. Similarly, the owner holding the leash housing 200 will sense that his pet is pulling harder as it reaches the end of the leash, and can hold the leash tighter to prevent the pet from pulling the leash housing 200 out of his hand.

Figure 9:
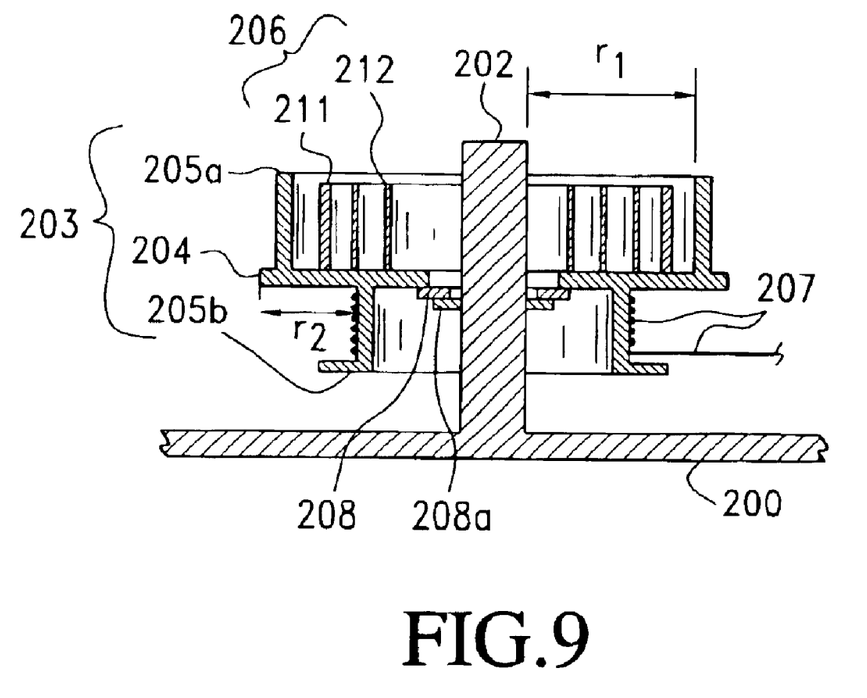
FIG. 9 shows a side view of a modified retractable pet leash according to the current invention.

An alternative embodiment of the invention is shown in FIG. 9. The structure of the pet leash is similar to the pet leash shown in FIG. 3, with the exception of the spool 203. In the modified spool, disc 204 is positioned on a washer 208 which sits on a flange 208a projecting from axle 202. Disc 204 is free to rotate. A cylindrical wall 205a having an inner surface and an outer surface projects from disc 204 toward the top surface of the housing (FIG. 9; top surface of the housing not shown). The cylindrical wall 205a is positioned so that the inner surface of the wall 205a is separated from axle 202 by a distance r1, with wall 205a being close to the peripheral edge of disc 204. A cylindrical wall 205b having an inner surface and an outer surface projects from disc 204 down toward the bottom surface of the housing. The cylindrical wall 205b is positioned so that the outer surface of the wall 205b is separated from axle 202 by a distance r2, with wall 205b being close to the axle 202. Wall 205b has a flange on its lower edge which projects outwardly, away from axle 202. A spirally coiled spring 206 having a plurality of low spring constant inner coils 212 and one or more high spring constant outer coils 211 is positioned between axle 202 and the inner surface of wall 205a by rigidly attaching the end of the innermost coil to axle 202, and rigidly attaching the end of the outermost coil to the inner surface of wall 205a. A leash or cord 207 has one end fixed to the outer surface of wall 205b. The cord is then wrapped around the outer surface of wall 205b. This arrangement has two significant advantages. First, it allows a greater length of cord 207 to be wrapped around wall 205b, without sacrificing strength by requiring the use of a thinner strand of cord or leash. Also, it reduces the distance between the axle 202 and the wall around which the cord 207 is wrapped. When the dog pulls on this cord, it applies tangential force F(tan) to the spool 3, where:

$$F(tan)=\tau/R$$

where τ is the torque exerted on the spool by the tangential force, and R is the radius of the outer surface of wall 205b, and is the moment arm of the tangential force. As is seen in the above equation, as the moment arm decreases, it takes more force to exert the same torque on the spool 203, making it harder for the animal to unwind cord 207. Since the wall 205b is closer to the axle 202 in the structure of FIG. 9 than is wall 205 in the structure of FIG. 3, the work that the animal must do to unwind cord 207 is increased.

Figure 10A:
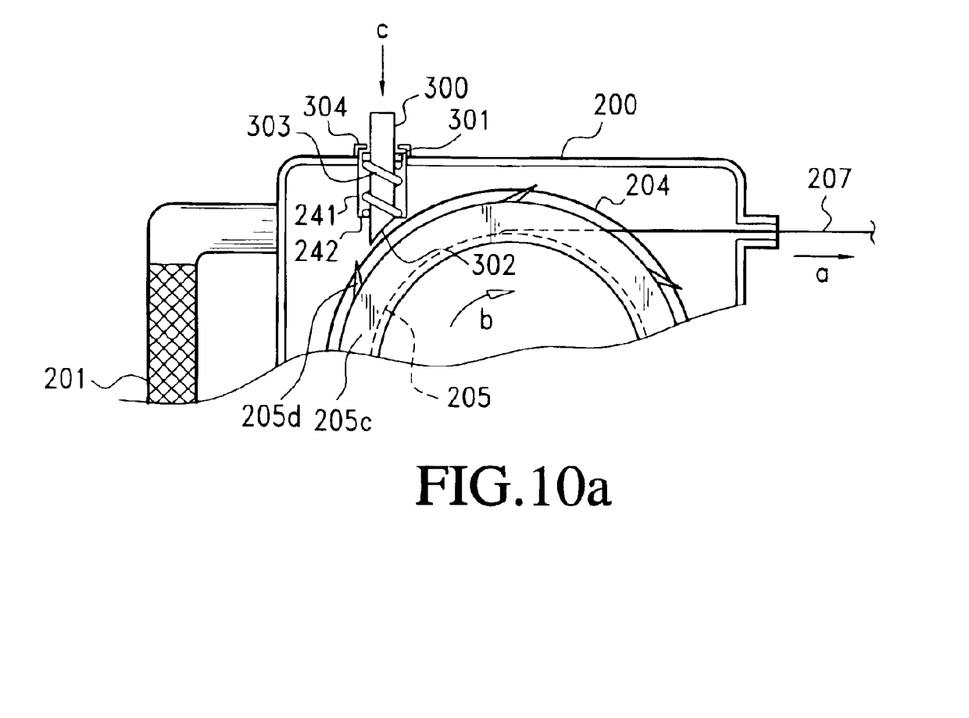
FIG. 10 shows a mechanism for stopping rotation of a take-up spool in a retractable pet leash.
Figure 10B:
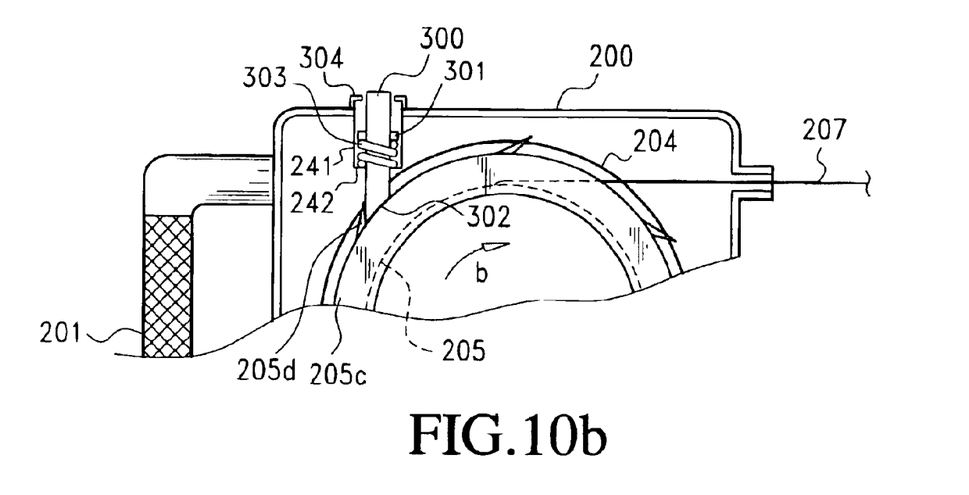

In case the animal lunges or runs toward another animal or a person, a braking mechanism for immediately stopping rotation of spool 203 is needed. This invention successfully supplements the variable resistance spring mechanism described above with such a braking mechanism (FIG. 10a). The variable resistance spring forces the animal to work harder to move forward as he reaches the end of the leash, whereas the braking mechanism allows the owner to immediately stop further forward movement of the animal, regardless of how much of the leash has unwound from the spool. A pushbutton 300 is mounted in a hole in the peripheral wall of housing 200, said hole having a tubular wall 241 and an inwardly directed flange 242. A coiled spring 303 is positioned between flange 242 and a flange 301 on button 300, and acts to bias the pushbutton outwardly. A flange 304 on the outer surface of housing 200 prevents the button from disengaging from housing 200. As the animal pulls cord 207 in the direction of arrow a, the spool rotates in the direction of arrow b relatively freely, unless button 300 is pushed inwardly in the direction of arrow c. When the button is pushed inwardly, the lower surface 302 of button 300 contacts the outer surface of wall 205, or the portion of cord 207 still wound around wall 205. Alternatively, the lower surface 302 of button 300 engages a tooth 205d provided on the outer edge of flange 205c. This stops rotation of the spool, preventing further forward motion of the animal.

As the animal moves away from the housing, the cord pays out from the reel. As a first portion of the cord pays out, a primary spring offers very light resistance to rotation of the spool, allowing the animal to freely move away from the housing. As a second portion of the cord, typically extending from the point of attachment of the cord to the spool to a point which is typically at least two feet from the spool, pays out, a secondary spring applies significantly greater resistance to rotation of the spool. The animal has to pull harder to unwind the second portion of the cord. Also, if the animal runs away from the spool, the secondary spring serves as a shock absorber. When the animal reaches the beginning of the second portion of the cord, the strong secondary spring acts to attenuate the impact of the animal's collar against his throat. The secondary spring also provides a warning to the animal that he is running out of room to run freely by forcing the animal to pull harder to move farther away from the spool. Also, when the animal reaches the beginning of the second portion of the cord, the strong secondary spring attenuates the force with which the animal pulls against the hand-held spool, making it less likely that the spool will be pulled out of the owner's hand. Additionally the experience of walking the pet is made more comfortable for the owner. In prior art retractable leashes, when the pet reaches the end of the cord, the owner experiences an unpleasant jerk on the leash handle in his hand. The variable resistance spring in the current invention attenuates the force exerted on the leash handle as the pet reaches the end of the cord, resulting in a gradual pull on the owner's hand. This allows the owner to grasp the leash handle more tightly, reducing the likelihood that the pet will pull the leash out of his hand.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as defined in the claims.

What is claimed is:

1. A retractable animal tether, comprising:
   a) a support;
   b) a spool mounted on the support, said spool being rotatable;
   c) a leash wound on the spool; and
   d) at least one spring having a variable cross-sectional area and being configured to provide variable resistance to rotation of the spool, wherein an effective spring constant of said at least one spring changes as the spool rotates.

2. The device of claim 1, additionally comprising a braking means, wherein activation of said braking means prevents unwinding of the leash from the spool.

3. The device of claim 2, wherein said braking means acts independently of said at least one spring.

4. The device of claim 3, wherein said at least one spring activates automatically, providing increased resistance to rotation of the spool as a defined portion of the cord is unwound from the spool; and wherein said braking means is activated by a user and stops rotation of the spool to prevent unwinding of the leash from the spool.

5. The device of claim 1, wherein the at least one spring comprises a first spring having a spring constant K1 and a second spring having a spring constant K2, where K2 is less than K1.

6. The device of claim 1, wherein the at least one spring comprises a single spring having a variable spring constant.

7. The device of claim 6, wherein the spool is rotatably mounted on a nonrotatable axle, and the spring having a variable spring constant comprises a spirally coiled spring having an inner end which is rigidly connected to the axle, and an outer end which is rigidly connected with the spool at a predetermined radial distance from the axle;

wherein the spring has a first portion and a second portion, wherein said first portion of said spring has a spring constant K2; and said second portion of said spring has a spring constant K1, wherein K1 is either constant or variable;
   wherein K2 is less than K1.

8. The device of claim 7, wherein the first portion of the spring comprises a plurality of inner coils having a spring constant K2, and the second portion of the spring comprises at least one outer coil having a spring constant K1.

9. The device of claim 7, wherein the spring has a first portion having a constant spring constant K2, a second portion having a constant spring constant K1, and a third intermediate portion having a non-constant spring constant K3.

10. The device of claim 9, wherein the non-constant spring constant K3 changes in a stepwise fashion.

11. The device of claim 9, wherein the non-constant spring constant K3 changes in a gradual fashion.

12. The device of claim 7, wherein the coiled spring is manufactured from a first strip of metal of constant thickness, said first strip of metal having a first portion and a second portion; and a second strip of metal of constant thickness; said second strip of metal being fastened to the second portion of the first strip of metal.

13. The device of claim 12, wherein a plurality of second strips of metal of constant thickness is fastened to the second portion of the first strip of metal.

14. The device of claim 1, wherein the at least one spring comprises a plurality of springs.

15. The device of claim 14, wherein the spool is rotatably mounted on a nonrotatable axle, and the at least one spring comprises at least two springs which are coiled together; said at least two springs comprising a first spirally coiled spring having an inner end which is rigidly connected to the axle, and an outer end which is rigidly connected with the spool at a predetermined radial distance from the axle; and a second spirally coiled spring which is shorter than the first spirally coiled spring, said second spirally coiled spring having an outer end which is rigidly connected with the outer end of the first spirally coiled spring.

16. The device of claim 15, wherein rotation of the spool initially applies tension on said first spirally coiled spring, wherein said first spirally coiled spring has a spring constant K2; and wherein continued rotation of the spool subsequently applies tension on both said first spirally coiled spring and said second spirally coiled spring, wherein said first spirally coiled spring and said second spirally coiled spring act as a single spring having an effective constant spring constant K1;
   wherein K2 is less than K1.

17. The device of claim 1, wherein said at least one spring having a variable cross-sectional area comprises:
   a) a single-layered spring having a variable cross-sectional area; or
   b) a multilayered spring, where a thick portion of the multilayered spring has a greater number of layers than a thin portion of the multilayered spring.

18. The device of claim 17, wherein said multilayered spring comprises:
   i) a multilayered spring comprising at least a first layer and a second layer, said first layer and said second layer being laminated together; or ii) a multilayered spring comprising at least a first spring and a second spring, wherein said first spring and said second spring are able to flex independently.

19. A retractable animal tether, comprising:
a) a support;
b) a spool mounted on the support, said spool being rotatable;
c) a leash wound on the spool; and
d) a single spirally coiled spring having a variable effective spring constant and being configured to provide variable resistance to rotation of the spool, wherein said variable effective spring constant increases as the spool rotates so as to unwind the leash;
wherein the coiled spring is manufactured from a strip of metal, said strip of metal having a variable cross-sectional area.

20. A retractable animal tether, comprising:
a) a support;
b) a spool rotatably mounted on the support;
c) a leash wound on the spool, said leash having a first portion having an end which is connected to the spool, and a second portion having a free end; and
d) at least one spring having a variable cross sectional area, said spring applying a variable resistance to rotation of said spool;
wherein the at least one spring prevents the second portion of the leash from unwinding from the spool unless a first force F1 is applied to the second portion of the leash; and
wherein the at least one spring prevents the first portion of the leash from unwinding from the spool unless a second force F2 is applied to the first portion of the leash, said force F2 being greater than said force F1.

21. The device of claim 20, additionally comprising a braking means, wherein said braking means prevents unwinding of the leash from the spool.

22. The device of claim 20, wherein the at least one spring comprises a first spring and a second spring, said first spring having a spring constant K1, wherein tension is applied to said first spring by rotation of the spool while said first portion of the leash is unwinding, but not while the second portion of the leash is unwinding.

23. The device of claim 22, wherein said second spring has a spring constant K2, wherein tension is applied to said second spring by rotation of the spool while said second portion of the leash is unwinding, where K2 is less than K1.

24. The device of claim 23, wherein said first spring and said second spring comprise separate portions of a single spring having a variable spring constant.

25. The device of claim 20, wherein the at least one spring comprises a single spring having a variable spring constant.

26. The device of claim 25, wherein the spool is rotatably mounted on a nonrotatable axle, and the single spring having a variable spring constant comprises a spirally coiled spring having an inner end which is rigidly connected to the axle, and an outer end which is rigidly connected with the spool at a predetermined radial distance from the axle;
wherein the spring has a first portion having a spring constant K2, and a second portion having a spring constant K1, where K2 is less than K1.

27. The device of claim 26, wherein the spring has a first portion having a spring constant K2, a second portion having a spring constant K1, and a third intermediate portion having a non-constant spring constant K3.

28. A retractable animal tether, comprising:
a) support;
b) a spool rotatably mounted on the support;
c) a leash wound on the spool, said leash having a first portion having an end which is connected to the spool, and a second portion having a free end; and
d) at least one spring having a variable spring constant, said spring applying a variable resistance to rotation of said spool;
wherein the at least one spring prevents the second portion of the leash from unwinding from the spool unless a first force F1 is applied to the second portion of the leash; and
wherein the at least one spring prevents the first portion of the leash from unwinding from the spool unless a second force F2 is applied to the first portion of the leash, said force F2 being greater than said force F1;
wherein the spring has a first portion having a spring constant K2, a second portion having a spring constant K1, and a third intermediate portion having a non-constant spring constant K3;
wherein the coiled spring is manufactured from a strip of metal, said strip of metal having a variable cross-sectional area.

29. The device of claim 28, wherein the coiled spring is manufactured from a first strip of metal of constant thickness, said first strip of metal having a first portion and a second portion; and a second strip of metal of constant thickness; at least one end of said second strip of metal being fastened to the second portion of the first strip of metal.

30. A device for retractably holding a cord, comprising:
a) a housing;
b) an axle rigidly mounted in the housing;
c) a spool having an inner surface and an outer surface rotatably mounted on the axle, wherein the inner surface of the spool is spaced from the axle;
d) a flexible cord wound on the outer surface of the spool, said cord having a first end which is rigidly connected to the spool and a second end which extends through a passage in the housing; and
e) a spirally coiled spring having a variable spring constant, said spring having a first end which is rigidly connected to the axle, and a second end which is rigidly connected to the inner surface of the spool; said first end of said spring having a lower spring constant than said second end of said spring;
wherein the spring exerts a variable resistance to rotation of the spool.

31. A retractable animal tether, comprising:
a) an axle;
b) a spool mounted on the axle, said spool being rotatable;
c) a leash wound on the spool; and
d) at least one spring acting between said spool and said axle, said at least one spring having a first end connected to said axle and a second end connected to said spool, said first end of said at least one spring having a lower spring constant than said second end of said at least one spring;
wherein said at least one spring provides variable resistance to rotation of the spool.

* * * * *